(12) United States Patent
Yin et al.

(10) Patent No.: US 12,283,822 B2
(45) Date of Patent: Apr. 22, 2025

(54) HYBRID ENERGY SYSTEMS

(71) Applicants: Alliance North America, Inc., Cypress, CA (US); SPOC Grid Inverter Technologies, Inc, Trussville, AL (US)

(72) Inventors: Michael Yin, Santa Ana, CA (US); Brian Quock, Huntington Beach, CA (US); Stacey Brooks, Boaz, AL (US); Christian Mason, Trussville, AL (US); Ben Gully, Anacortes, WA (US); Andrew Williams, Pass Christian, MS (US)

(73) Assignees: Alliance North Amerca, Inc., Cypress, CA (US); SPOC Grid Inverter Technologies, Inc., Trussville, AL (US)

( * ) Notice: Subject to any disclaimer, the term of this patent is extended or adjusted under 35 U.S.C. 154(b) by 0 days.

(21) Appl. No.: 18/320,428

(22) Filed: May 19, 2023

(65) Prior Publication Data

US 2023/0378766 A1 Nov. 23, 2023

Related U.S. Application Data

(60) Provisional application No. 63/344,117, filed on May 20, 2022.

(51) Int. Cl.
  *H02J 4/00* (2006.01)
  *H02J 7/00* (2006.01)
  *H02S 10/10* (2014.01)

(52) U.S. Cl.
  CPC .............. *H02J 4/00* (2013.01); *H02J 7/0068* (2013.01); *H02S 10/10* (2014.12)

(58) Field of Classification Search
  CPC . H02J 4/00; H02J 7/0068; H02J 3/381; H02S 10/10
  See application file for complete search history.

(56) References Cited

U.S. PATENT DOCUMENTS

| 5,563,802 | A | 10/1996 | Plahn et al. |
| 6,172,428 | B1 | 1/2001 | Jordan |

(Continued)

FOREIGN PATENT DOCUMENTS

| CN | 111628519 | 9/2020 |
| CN | 111756065 | 10/2020 |
| GB | 2527806 | 1/2016 |

OTHER PUBLICATIONS

International Search Report and Written Opinion from corresponding Patent Cooperation Treaty (PCT) Application No. PCT/IB23/55202, completed Jul. 25, 2023.

*Primary Examiner* — Lincoln D Donovan
*Assistant Examiner* — Alex W Lam
(74) *Attorney, Agent, or Firm* — Gardner, Linn, Burkhart & Ondersma LLP

(57) ABSTRACT

A hybrid energy system is configured to carry a power load for a generator configured to output a first AC signal. The hybrid energy system includes a battery bank, a DC/DC converter, an AC/DC converter, and a DC/AC converter. The battery bank includes a plurality of batteries and outputs a first DC signal. The DC/DC converter, operating in a first mode, receives and converts the first DC signal into a second DC signal, which is output to a DC bus. The AC/DC converter receives and converts the first AC signal into a third DC signal. The second DC signal and the third DC signal are tied together on the DC bus. The DC/AC converter receives and converts the second DC signal from the DC bus into a plurality of second AC signals, which are output to an AC outlet interface.

19 Claims, 13 Drawing Sheets

(56) References Cited

U.S. PATENT DOCUMENTS

| | | |
|---|---|---|
| 6,487,096 B1 | 11/2002 | Gilbreth et al. |
| 7,353,084 B2 | 4/2008 | Schaper et al. |
| 7,692,409 B2 | 4/2010 | Schaper et al. |
| 7,956,584 B2 | 6/2011 | Peterson et al. |
| 7,999,405 B2 | 8/2011 | Peterson |
| 8,373,949 B2 | 2/2013 | Bourgeau |
| 8,706,330 B2 | 4/2014 | Caouette |
| 8,987,939 B2 | 3/2015 | Yu et al. |
| 9,099,882 B2 | 8/2015 | Lammers et al. |
| 9,118,206 B2 | 8/2015 | Peterson et al. |
| 9,118,213 B2 | 8/2015 | Koehl |
| 9,425,727 B2 | 8/2016 | Albsmeier et al. |
| 9,444,252 B2 | 9/2016 | Bourgeau |
| 9,692,235 B2 | 6/2017 | Munier et al. |
| 9,742,193 B2 | 8/2017 | Jain et al. |
| 10,003,290 B2 | 6/2018 | Hardwick et al. |
| 10,389,113 B2 | 8/2019 | Bourgeau |
| 10,483,758 B2 | 11/2019 | Liang et al. |
| 10,790,670 B1 | 9/2020 | Alimadad |
| 2012/0056436 A1 | 3/2012 | Russell et al. |
| 2012/0267952 A1* | 10/2012 | Ballatine .......... H02J 7/34 307/26 |
| 2015/0130277 A1 | 5/2015 | Ballantine et al. |
| 2015/0217656 A1* | 8/2015 | Loftus .......... B60L 1/006 320/136 |
| 2019/0350104 A1* | 11/2019 | Belady .......... H02J 1/106 |
| 2022/0029417 A1 | 1/2022 | Bourgeau |

\* cited by examiner

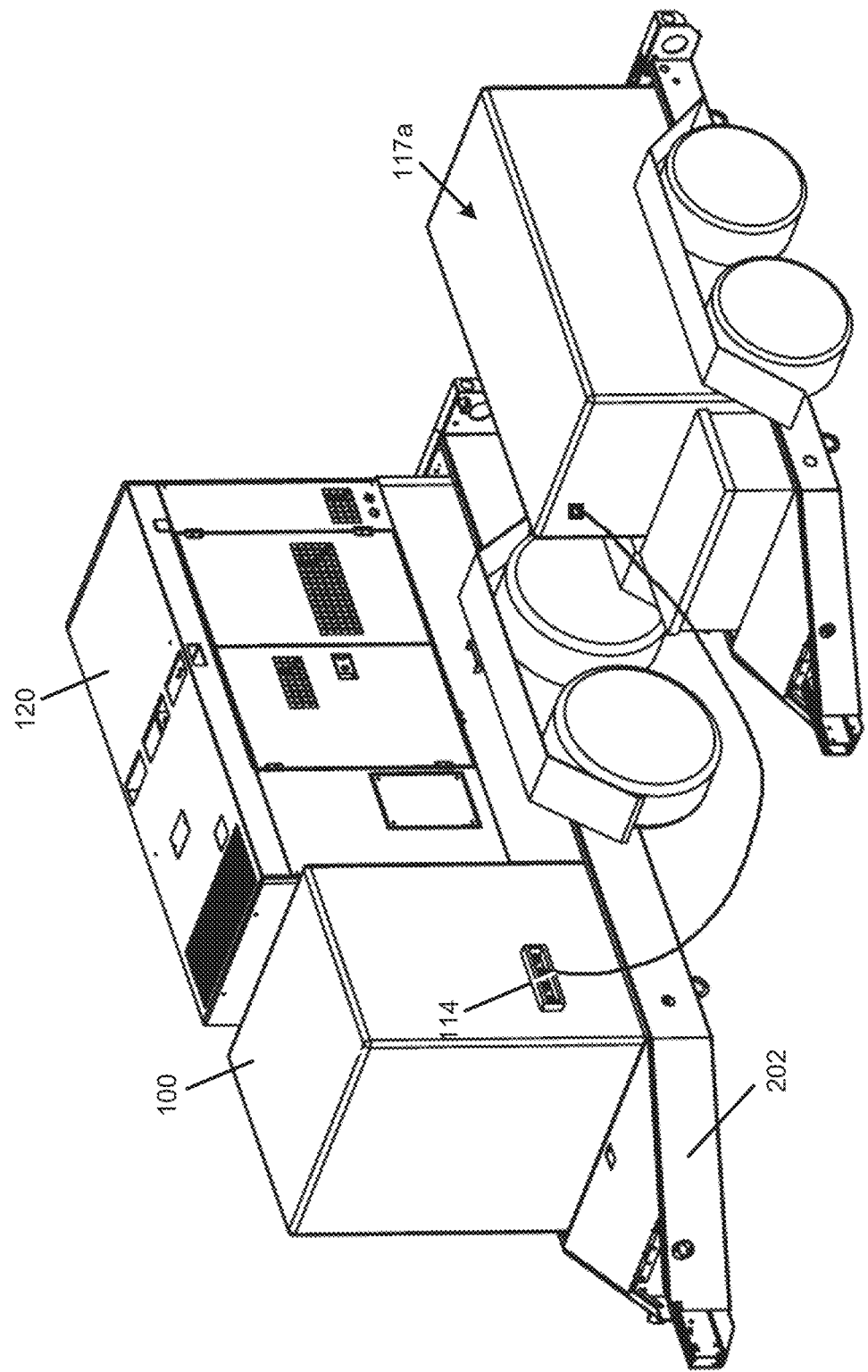

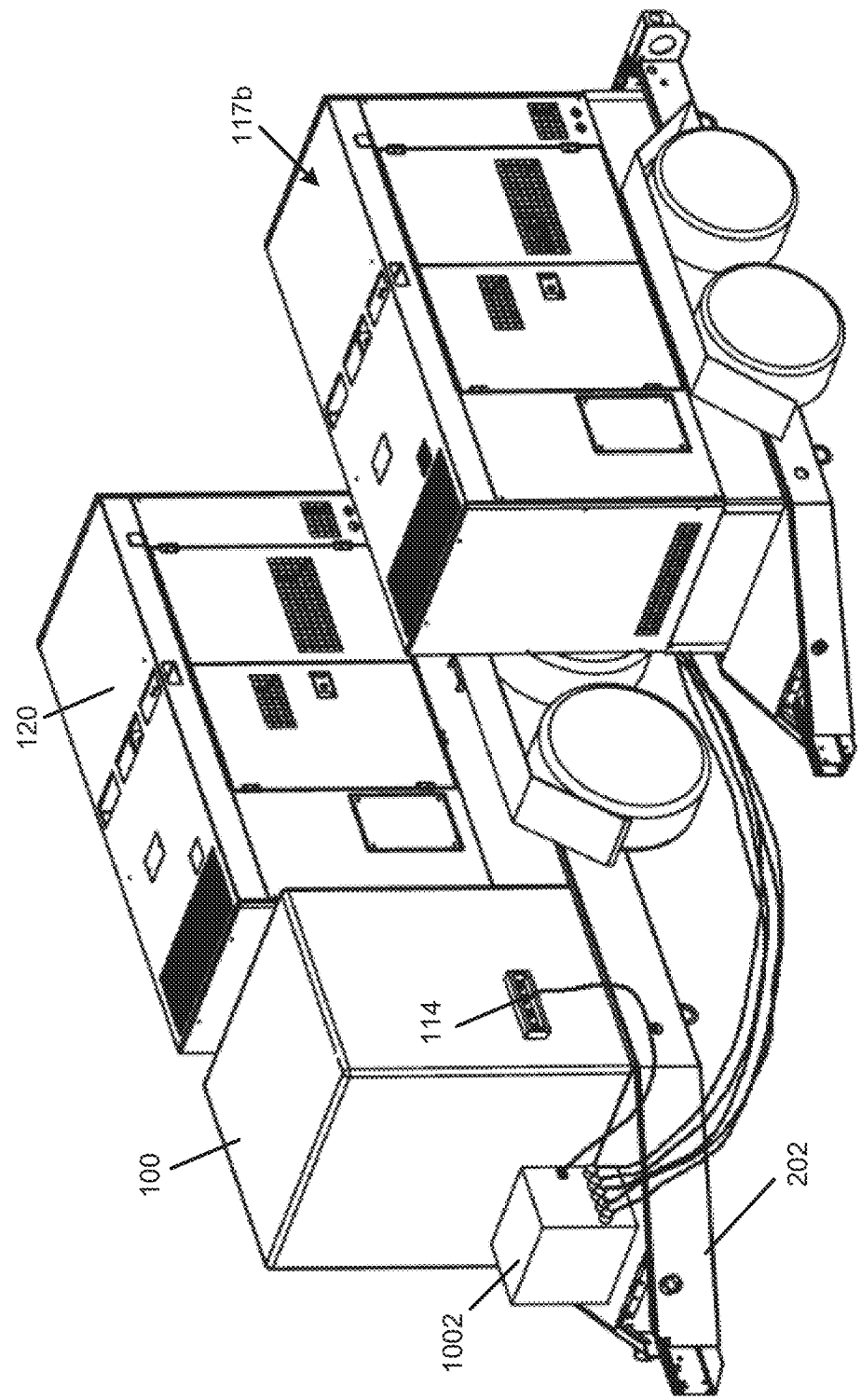

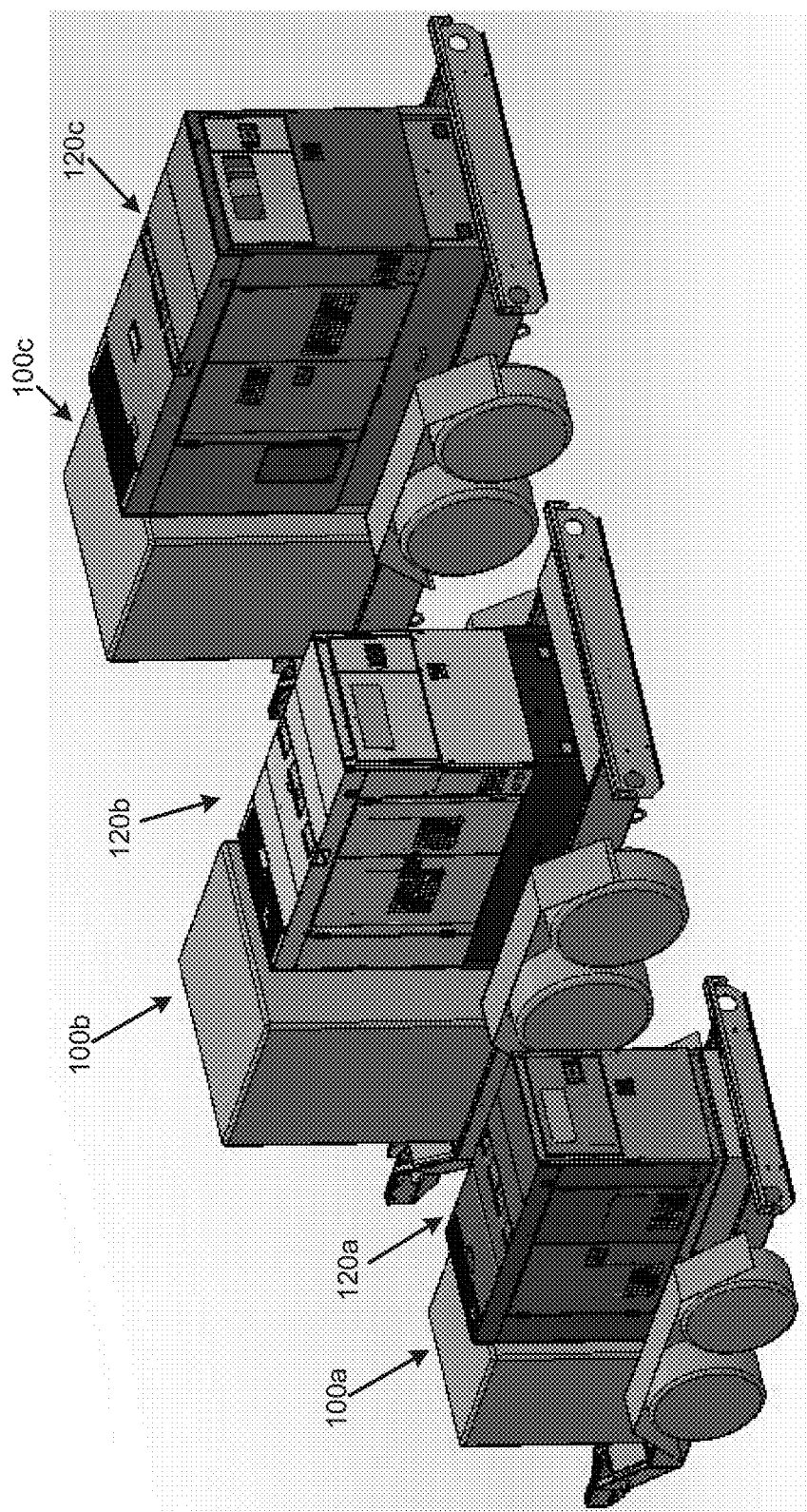

HYBRID ENERGY SYSTEMS

CROSS REFERENCE TO RELATED APPLICATIONS

The present application claims the filing benefits of U.S. provisional application, Ser. No. 63/344,117, filed May 20, 2022, which is hereby incorporated by reference herein in its entirety.

FIELD OF THE INVENTION

The present invention is directed to battery systems, power generation, system controls, and in particular to battery storage systems in combination with generators in mobile and stationary applications.

BACKGROUND OF THE INVENTION

Generators are often driven by engines, such as diesel engines, and other engines using a variety of fuels, e.g., propane, natural gas, gasoline, biodiesel, and hydrogen. When properly loaded, a diesel engine provides an efficient driver for a generator, when lightly loaded, diesel engines are susceptible to wet stacking (i.e., when unburnt diesel fuel passes into the diesel exhaust system and produces an oily residue). Wet stacking happens when a diesel engine is running at a low percentage or proportion of its capacity. For example, a diesel engine coupled to a generator is susceptible to wet stacking when the generator it is driving has no load or only a minimal load coupled to it; in addition the generator operates less efficiently (more fuel is consumed per kwh produced versus an optimally loaded generator). When the generator is operating with no load or only a minimal load, the diesel engine is operating in an inefficient manner, resulting in the risk of wet stacking because the diesel engine is not at a proper operating temperature (allowing unburnt fuel to escape into the diesel exhaust system). Diesel engines are most efficient when they are running at a sufficient percentage or proportion of their full capacity. When a diesel engine is running under a sufficient load, the diesel engine can run at an optimum operating temperature. Generators used to power electrical equipment typically see variable loads through their normal usage intervals. To aid in the prevention of wet stacking of diesel engines coupled to generators, dummy loads or load banks can be applied to their generators. The load banks provide a load on the generator that is sufficient to prevent wet stacking of the generator's diesel engine. However, when a load bank or an actual load is applied to increase the load on the generator, the diesel generator, while cleaner burning, will consume significantly more fuel to meet the increased generator load.

SUMMARY OF THE INVENTION

Embodiments of the present invention provide a system for managing an operational environment of an engine-driven generator. Example engines include a variety of fuel sources, for example, diesel, propane, natural gas, gasoline, biodiesel, and hydrogen. A hybrid energy system improves the efficiency of an engine-powered generator by running the generator at its optimal load and reducing the generator's run time by storing unused power, or power the generator is capable of producing that is more than the load requires, in a battery. Use of the hybrid energy system completely eliminates light loading and wetstacking issues on the engine/generator, as well as allows the engine/generator to power down while the batteries in the hybrid energy system supplies power to the load. When the battery of the hybrid energy system is sufficiently charged, the engine/generator can be shut down to reduce engine/generator run time and the battery used to run the load until it reaches a low charge threshold (in percentage or battery voltage). The engine/generator would be turned back on to power the load when the battery charge reaches this low charge threshold. With the engine/generator powering the load, the battery can be recharged by the generator's available power output that exceeds the load. The engine/generator can also be turned on when the power load requirements are above a load threshold with respect to the generator and/or the battery. Thus, the hybrid energy system minimizes engine/generator run hours, improves fuel consumption, and reduces emissions compared to a conventional engine/generator set up to power a load.

The hybrid energy system includes a battery bank that includes a plurality of batteries that are arranged in an electrical circuit to supply a desired voltage output. The hybrid energy system may include a DC/DC converter that adjusts (raises or lowers) the voltage output of the battery bank to a desired DC voltage that is applied to a DC bus. The hybrid energy system may include an AC/DC converter that receives and converts an AC voltage from the generator to a DC voltage that is applied to the DC bus. The hybrid energy system includes a DC/AC converter that converts the DC voltage from the DC bus to an AC voltage that is applied to an AC outlet panel, which may include filters and/or transformers. The hybrid energy system may also include a DC bus interface that is coupled to the DC bus for supplying DC power to an external load and/or for supplying DC power to the DC bus from an external DC power source. The hybrid energy system powers a load while the engine/generator is powered down.

In another embodiment of the present invention, a hybrid energy system is configured to provide a load to a generator while the generator charges the hybrid energy system, and with the hybrid energy system further configured to power a load such that the generator can be powered down. The hybrid energy system includes a battery bank that includes a plurality of batteries arranged into a configuration to output a first DC voltage at a desired voltage level. The hybrid energy system may include a DC/DC converter, an AC/DC converter, and a DC/AC converter. The DC/DC converter converts the first DC voltage from the battery bank to a second DC voltage that is applied to a DC bus. The AC/DC converter converts a first AC voltage from the generator to a third DC voltage that is applied to the DC bus. The second DC voltage and the third DC voltage have about the same target voltage levels and are applied to a common DC bus. The DC/AC converter converts the DC voltage from the DC bus to a second AC voltage. The second AC voltage is applied to an AC outlet interface that provides for a variety of AC voltage levels using various step up or step down transformers to obtain the desired voltage for the AC outlet interface. The DC/DC converter supplies a fourth DC voltage to the battery bank to recharge the battery bank.

In a further embodiment of the present invention, an exemplary hybrid energy system is configured to carry a power load for a generator configured to output a first AC signal. The hybrid energy system includes a battery bank, a DC/DC converter, an AC/DC converter, and a DC/AC converter. The battery bank includes a plurality of batteries and outputs a first DC signal. The DC/DC converter, operating in a first mode, receives and converts the first DC signal into a second DC signal, which is output to a DC bus. The AC/DC converter receives and converts the first AC signal into a third DC signal. The second DC signal and the third DC signal have a same voltage level. The DC/AC converter receives and converts the second DC signal from the DC bus into a second AC signal, which is output to an AC outlet interface.

In yet another embodiment of the present invention, an exemplary method for controlling a hybrid energy system that is carrying a power load of a generator includes outputting a first DC signal from a battery bank. The method includes receiving and converting with a DC/DC converter, the first DC signal into a second DC signal and outputting the second DC signal to a DC bus. A first AC signal, output by the generator, is received and converted by an AC/DC converter into a third DC signal. The second DC signal and the third DC signal have a same voltage level. The method also includes receiving and converting, with a DC/AC converter, the second DC signal from the DC bus into a second AC signal. The second AC signal is output to an AC outlet interface.

In an aspect of the present invention, the hybrid energy system is positioned upon a trailer or truck bed that also holds the engine/generator. In another aspect of the present invention, the engine/generator and the hybrid energy system are combined in a unified body (i.e., an "all-in-one" body rather than two separate bodies that are coupled) that may be positioned upon a trailer or truck bed or upon some other surface.

In a further aspect of the present invention, an external battery system is coupled to the DC bus via a DC bus interface. The external battery system is configured to provide DC power to the DC bus and/or to receive DC power from the DC bus via the DC bus interface.

In a further aspect of the present invention, an external generator is coupled to the DC bus via a DC bus interface and/or an AC bus via an AC bus interface. The external generator is configured to provide AC power to the AC bus via the AC bus interface and/or provide DC power to the DC bus via the DC bus interface.

In another aspect of the present invention, an exemplary hybrid energy system is configured to allow a generator to operate at an optimal or full load (approximately up to 100%) while charging batteries and powering existing loads while maximizing fuel usage for a majority of the time the generator is running (unless at warm-up and cool-down modes). This applies to both a fixed speed generator at a certain engine RPM or a variable speed generator where the engine may rev higher (which provides more output power to the common DC bus) or lower (which provides less power but may improve fuel consumption). This allows more power to be generated by the generator to offset a load that is greater than what the battery is able to output from its DC/DC converter. Higher loads on the AC outlet interface are sensed by the DC/AC converter, which causes the controller to run a variable speed generator at a higher rpm as needed to offset the demand.

In yet another aspect of the present invention, the DC/AC converter is configured to adjust the AC voltage output at the AC outlet interface up or down to produce an adjusted AC voltage with an adjusted voltage level.

In a further aspect of the present invention, the system is configured to simultaneously provide a plurality of AC signals at a plurality of voltage levels.

In another aspect of the present invention, the battery bank and an external battery bank are controlled independently, such that the battery bank and the external battery bank are charged and/or discharged at varying rates to maximize cycle life, improve overall system efficiency, and operation.

In yet another aspect of the present invention, the hybrid energy system is configured to work with any fuel-type generator, such as propane, natural gas, gasoline, ethanol, biodiesel, or hydrogen.

In a further aspect of the present invention, the hybrid energy system is configured to interface with, and to function with, a DC generator by replacing the AC/DC converter with a DC/DC converter. The DC/DC converter in this aspect would not be required if the DC generator can output a DC voltage that matches the DC bus. In this configuration, there are only two converters (i.e., a DC/DC converter for the battery and a DC/AC converter to the AC outlet interface). The AC/DC converter has been replaced with the DC generator.

In another aspect of the present invention, the controller is configured to control the recharging of the battery bank such that the generator, when running, operates at an optimal and/or full load. The controller is configured to control the discharge of the battery bank, such that an operational run time of the generator is minimized.

In yet another aspect of the present invention, the controller is configured to output a startup signal to the generator to start outputting the first AC signal when the controller selects the second mode for the DC/DC converter. The controller is configured to control the operation of the generator such that the generator warms up and cools down before shutdown. The controller controls the operation of the generator such that the generator ramps up its power output and ramps down its power output.

In a further aspect of the present invention, the hybrid energy system is paralleled with a second generator. The two generators are configured to utilize a common output bus such that the second generator may be utilized as a spinning reserve.

The exemplary system controls and the DC bus configuration allow for a smooth transfer of power to and from the generator and the battery bank. A loss of one of the input power sources (either the generator or the battery bank) will not result in an immediate loss of power.

These and other objects, advantages, purposes, and features of the present invention will become apparent upon review of the following specification in conjunction with the drawings.

BRIEF DESCRIPTION OF THE DRAWINGS

FIG. 6A is a perspective view of the hybrid energy system and generator of FIG. 2 and illustrating a second hybrid energy system cabled to the DC bus access panel in accordance with the present invention;

FIG. 6B is a perspective view of the hybrid energy system and generator of FIG. 2 and illustrating a second generator (or multiples of) cabled to the DC bus access panel, allowing for generator redundancy or combined power by connecting the secondary generator to its own hybrid energy system in accordance with the present invention;

FIG. 6E is a perspective view of a variety of hybrid energy system and generator configurations in accordance with the present invention;

DESCRIPTION OF THE PREFERRED EMBODIMENTS

Figure 1:
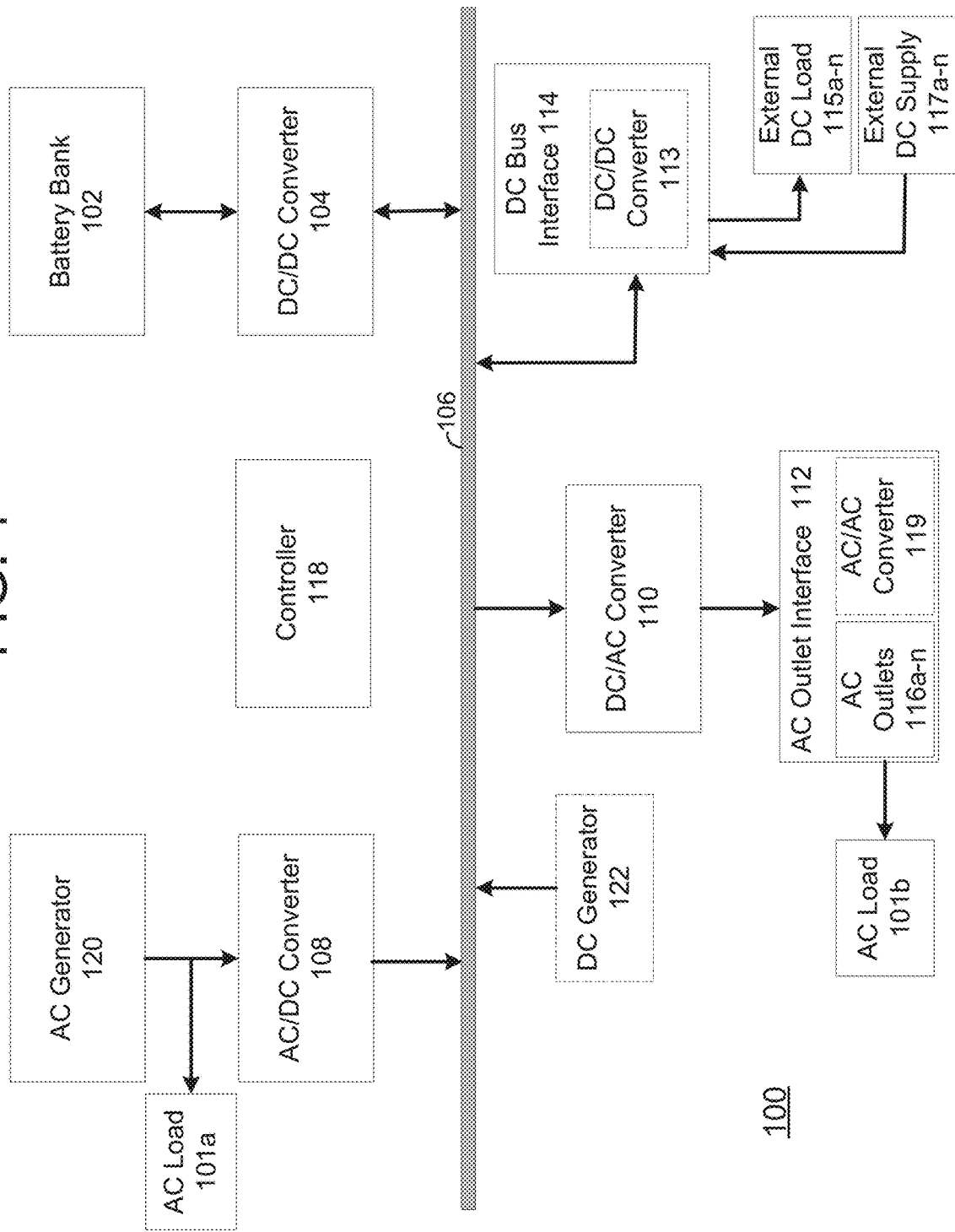
FIG. 1 is a block diagram illustrating an exemplary hybrid energy system and generator coupling via converters to a DC bus in accordance with the present invention.

Referring to the drawings and the illustrative embodiments depicted therein, a hybrid energy system provides for the elimination or reduction of loading issues on engine driven generators. Such engines may be powered by a variety of fuels, for example, diesel, propane, natural gas, gasoline, biodiesel, and hydrogen. The engine/generators include, for example, exemplary diesel engine driven generators, such as, for example, EPA Tier 4F certified or other similarly compliant diesel engine driven mobile generators (as well as Stage 5 or higher). The hybrid energy system also provides for the powering down of the diesel engine driven generators while the hybrid energy system provides power to a load. Exemplary hybrid energy systems may be either unified or arranged alongside portable prime power skid generators or trailer-mounted diesel generators and provide selective AC and/or DC power output to power a load while the generator is powered down. Alternatively, the hybrid energy system is designed for a stationary application as well as a mobile application. Alternatively, the hybrid energy system provides an additional power load (the unused power is used to recharge the battery bank of the hybrid energy system) to an associated generator when a real load is below a threshold load value. Most generators are more efficient at a full load or close to it where a generator can provide more kilowatts per volume of fuel consumed compared to being light loaded where efficiency is decreased. Light loading certain generators, such as diesel generators, introduces engine and exhaust problems with unburned fuel that require additional generator maintenance and repair. Powering a load with a generator running at its optimal or full load and utilizing any or all remaining power from the generator to charge batteries that can be used to power the load while the generator is off greatly improves the generator's efficiency and reduces overall fuel consumption, emissions, and run hours. Exemplary embodiments discussed herein pertain to temporary or portable power generation and energy storage that can be transported from one location to another or may be a permanent installation.

FIG. 1 illustrates a hybrid energy system 100 that includes an exemplary AC generator 120 and a battery bank 102. An exemplary AC/DC converter (active front end "AFE") 108 is electrically coupled to the AC generator 120, while a bidirectional DC/DC converter 104 is electrically coupled to the battery bank. A DC bus is configured to electrically couple the AC/DC converter 108 and the bidirectional DC/DC converter 104. A DC/AC converter 110 and a DC bus interface 114 are electrically coupled to the DC bus 106. As illustrated in FIG. 1, an AC load 101a is coupled to the AC generator 120, a second AC load 101b is coupled to AC outlets 116a-n of an AC outlet interface 112, which is electrically coupled to the DC/AC converter 110. FIG. 1 also illustrates external DC loads 115a-n and/or external DC power supplies 117a-n coupled to the DC bus 106 via the DC bus interface 114 to connect to multiple energy trailers (e.g., an external battery bank), or other DC devices.

As illustrated in FIG. 1, the hybrid energy system 100 is configured to receive power from the AC generator 120, which is configured to output an AC voltage (e.g., three-phase 480 VAC). The AC/DC converter 108, which is electrically coupled to the AC generator 120, is configured to convert the generator's AC voltage output to a selected DC voltage that is applied to the DC bus 106. In an aspect of the present embodiment, the AC/DC converter 108 is an exemplary active front end (AFE) inverter and includes power magnetics (filters) and associated hardware and software (see FIGS. 3-5) to convert an AC signal to a DC signal. An exemplary AC/DC converter 108 is manufactured using insulated-gate bipolar transistor (IGBT) technology. In a further aspect of the present embodiment, the AC/DC converter 108 (implemented as an active front end inverter) is configured to eliminate harmonics and to provide a power factor for the AC generator 120 of unity (1.0), or near unity, in an ideal case where 100% of the current output from the AC generator 120 contributes to real power in the load. In an aspect of the present embodiment, the AC/DC converter 108 is configured to provide a power factor of 0.95 to 1.0. When the exemplary AC/DC converter 108 is achieving a power factor of unity, or near unity, the current output of the AC generator 120 has a real power output that matches its apparent power output. Thus, the AC generator 120 meets the required load power output with a lower total current draw. This allows for a simpler and less expensive diesel generator build because of the lower total current draw requirement. The exemplary AC/DC converter 108 is an improvement over conventional engine-powered generators and AC/DC inverter assemblies, which are required to deal with undesirable harmonics and a lower power factor that are put back on the engine-powered generator.

The DC voltage output by the AC/DC converter 108 is approximately the same voltage level as the DC voltage output by the bidirectional DC/DC converter 104 (e.g., approximately 700 VDC). For example, in one exemplary embodiment, the AC/DC converter 108 and the bidirectional DC/DC converter 104 are both configured to output a DC voltage of approximately 700 VDC. That is, the DC voltages output by the AC/converter 108 and the DC/DC converter 104 are within +/−10% of the desired voltage level. In other embodiments, the converters could be configured for different voltage outputs.

The battery bank 102, which includes a plurality of batteries, is configured to output a selected DC voltage (see FIG. 2B). In one exemplary embodiment, the battery bank 102 is configured to output a DC voltage (e.g., 250-400 VDC). With the addition of more batteries, a higher output DC voltage (up to the maximum DC bus voltage) is possible by arranging batteries in a series configuration. There is no system predefined limit to the kWh as additional batteries can be connected in parallel without impacting the DC battery voltage—as long as the battery management system (BMS) is configured and capable of handling the parallel connections The battery bank 102 is coupled to the bidirectional DC/DC converter 104 that is configured to convert the DC voltage output by the battery bank 102 to a selected DC voltage that is applied to the DC bus 106. In one exemplary embodiment, the 250-400 VDC output from the battery bank 102 is increased by the bidirectional DC/DC converter 104 to approximately 700 VDC. In an aspect of the present embodiment, the bidirectional DC/DC converter 104 is an exemplary bidirectional DC-to-DC converter that includes power magnetics (filters) and associated hardware and software (see FIGS. 3-5) to convert the DC signal into a different DC signal with a different voltage level. An exemplary bidirectional DC/DC converter 104 is manufactured using insulated-gate bipolar transistor (IGBT) technology. The bidirectional DC/DC converter 104 is configured as a dual mode or two-way converter for either discharging the battery bank 102 (while powering a load) or recharging the battery bank 102. In an aspect of the present embodiment, the bidirectional DC/DC converter 104 is configured to automatically reverse from outputting a DC voltage from the battery back 102 to begin recharging the battery bank 102 when the battery bank's output voltage/current drops below a threshold set point. The AC generator 120 is signaled to start either from a configurable state of charge reading of the battery bank 102 from an internal BMS, or a pre-defined load limit. These are exemplary programmable limits When operating in the second mode (or battery recharge mode), the bidirectional DC/DC converter 104 receives the approximately 700 VDC voltage output from the DC bus 106 and converts it (down) to the programmable charging voltage of the battery bank 102 (which will vary based on the number of batteries in the battery bank 102). This DC voltage is received by the battery bank 102 during the recharge mode. As discussed herein, when operating in the recharge mode, the bidirectional DC/DC converter 104 allows the AC generator 120 to operable at an optimal efficiency (at or near 100% power output). By recharging the battery bank 102 at a full or nearly full current output, the AC generator 120 is allowed to run most efficiently and to maximize its fuel efficiency.

The DC/AC converter 110 is coupled to the DC bus 106 and is configured to convert the DC voltage of the DC bus 106 (e.g., approximately 700 VDC) to an AC voltage that is applied to the AC outlet interface 112. In an aspect of the present embodiment, an exemplary DC/AC converter 110 is a DC to AC output inverter and is configured to simultaneously output multiple AC voltages, for example: single phase 120V and 240V, and three-phase 120V/208V and 277V/480V. Such voltage, phase, and frequency selections includes voltages and frequencies for use in Europe and Canada, as well as other applications that require different voltages and frequencies that the DC/AC converter can output. The DC/AC converter 110 includes transformers and associated hardware and software (see FIGS. 3-5) to convert the DC signal into the multiple AC signals. An exemplary DC/AC converter 110 is manufactured using insulated-gate bipolar transistor (IGBT) technology. The DC/AC converter 110 outputs the variety of AC voltage levels to respective AC outlets 116a-n of the AC outlet interface 112. Each of the exemplary AC voltage levels is supplied to one or more corresponding AC outlets 116a-n. For example, the AC outlet interface 112 can include two (or more) AC outlets 116a,b outputting 120 VAC, while only including single AC outlets 116c and 116d, each outputting 277 VAC or 480 VAC, respectively. Each of these AC voltage outputs from the AC outlets 116a-n are received by the AC load 101b.

FIG. 1 also illustrates an AC/AC converter 119. As illustrated in FIG. 1, in addition to the AC load 101b coupled to the AC outlets 116 of the AC outlet interface 112, the separate AC load 101a is coupled to the AC generator 120. The AC load 101a and the AC/DC converter 108 are arranged in a parallel circuit with the AC generator 120. While an exemplary load bank may be used to provide an additional loading on the AC generator 120, the AC loads 101a,b are considered "real" loads demanding AC power. Load banks are described in detail in U.S. patent application Ser. No. 17/668,579, which is hereby incorporated by reference herein in its entirety.

As also illustrated in FIG. 1, the hybrid energy system 100 includes the DC bus interface 114. The DC bus interface 114 is configured to provide external access to the DC bus 106. As discussed herein, one or more external DC power sources 117a-n may be coupled to the DC bus 106 via the DC bus interface 114 to supply additional DC power to the DC bus 106. Alternatively, one or more external DC loads 115a-n can be coupled to the DC bus 106 via the DC bus interface 114 to receive DC power from the DC bus 106. The DC bus interface 114 may also include an exemplary bidirectional DC/DC converter 113 for converting the DC voltage on the DC bus 106 to a desired DC voltage output for the external DC load 115a-n or for converting a DC voltage supplied by the external DC power source 117a-n to a desired DC voltage level to be applied to the DC bus 106.

As illustrated in FIG. 1, the bidirectional DC/DC converter 104 selectively converts the DC voltage of the DC bus 106 to a desired DC voltage for recharging the batteries of the battery bank 102. A controller 118, which is communicatively coupled to the battery bank 102 and the bidirectional DC/DC converter 104, controls the output of the battery bank 102 and controls the operation of the bidirectional DC/DC converter 104 (e.g., selective recharging of the battery bank 102). The bidirectional DC/DC converter 104 reacts to the DC bus voltage level—when it is above a setpoint, the batteries charge, and when it is below another setpoint, the batteries discharge. The controller 118 can dynamically change that setpoint to allow the independent load and source control of multiple energy sources (generators) or battery systems. The rate of charge of the batteries is dynamically controlled by the controller 118 and the DC/DC converter 104.

The controller 118 also controls the operation of the AC generator 120. For example, the controller 118 outputs a startup signal or shutdown signal to the AC generator 120 for starting and stopping the AC generator 120, respectively. The controller 118 controls the operation of the AC generator 120, such that the AC generator 120 can be warmed up at startup and cooled down before shutdown. Such control at startup and shut down by the controller 118 may include ramping up the power output of the AC generator 120 during startup and ramping down the power output of the AC generator 120 during shutdown. The controller 118 is also configured to control the recharging of the battery bank 102 such that the AC generator 120, when running, operates at an optimal (i.e., for fuel efficiency and operational conditions) and/or full load. The controller 118 may also be used to control the discharge of the battery bank 102 such that an operational run-time of the AC generator 120 is minimized. That is, by powering a load applied to the system with power from the battery bank 102 (when sufficiently charged as discussed herein), the AC generator 120 may be shutdown to save fuel and runtime.

Thus, the AC generator 120 and the hybrid energy system 100 (as controlled by the controller 118) may operate in a variety of modes. For example, in a first mode of operation, the AC generator 120 outputs AC voltage to power the AC load 101a, while the controller 118 selectively shuts down the AC/DC converter, such that the AC generator 120 does not supply power to the DC bus 106. In the case of a DC generator, there is no AC/DC converter, so the DC generator shuts down and does not supply power to the DC bus 106. The AC generator 120 may be in the first mode of operation when the AC generator 120 is supplying power to an AC load 101a that is above a power threshold with respect to a maximum power output of the AC generator 120. In the first mode of operation, the AC generator 120 supplies power to the AC load 101a while not providing power to either the AC outlet interface 112 or providing "recharging" power to the battery bank 102. In the first mode of operation, when the battery bank 102 has a sufficient charge, DC voltage may be output by the battery bank 102 to power external DC loads 115a-n (via the DC bus interface 114) and/or converted to AC signals via the DC/AC converter 110 to power an AC load 101b via the AC outlet interface 112. The exemplary AC generator 120 may be configured as a fixed speed generator (at a selected engine RPM) or a variable speed generator where the engine may increases its RPM rate (which provides more output power to the DC bus 106. Such arrangement allows more power to be generated by the generator 120 to offset a load that is greater than what the battery 102 is able to output from its DC/DC converter 104. Higher loads on the AC outlet interface 112 are sensed by the DC/AC converter 110, which causes the controller 118 to run a variable speed generator at a higher RPM as needed to offset the power demand.

In a second mode of operation, the AC generator 120 outputs AC voltage to the AC/DC converter 108 to supply power to the AC load 101a and/or the AC load 101b (via the DC bus 106 and the DC/AC converter 110). In the second mode of operation, the controller 118 has also deactivated the bidirectional DC/DC converter 104, such that AC generator 120 does not provide "recharging" power to the battery bank 102 because there is no or an insufficient quantity of "unused" power. When "deactivated," the bidirectional DC/DC converter 104 is not "shut off," it just no longer charges or discharges the battery bank 102.

In a third mode of operation, the AC generator 120 outputs AC voltage to the AC/DC converter 108 to supply power to the AC load 101a and/or the AC load 101b (via the DC bus 106 and the DC/AC converter 110). In the third mode of operation, the controller engages the bidirectional DC/DC converter 104 in a recharge mode such that the bidirectional DC/DC converter 104 provides "recharging" power to recharge the battery bank 102. The selective recharging of the battery bank 102 is controlled by the controller 118. Whether the battery bank 102 is recharged is dependent upon several factors that are monitored by the controller 118. For example, the controller 118 can allow the battery bank 102 to be recharged when a charge level of the battery bank 102 is below a first charge threshold, while stopping the recharging of the battery bank 102 when the charge level of the battery bank 102 is above a second charge threshold. The controller 118 can also selectively recharge the battery bank 102 depending on the AC loads 101a,b coupled to the AC generator 120 and/or the AC outlet interface 112, and depending on the external DC loads 115a-n coupled to the DC bus interface 114.

As discussed herein, the AC generator 120 can be used to selectively recharge the battery bank 102 such that the AC generator 120 is allowed to work under a loaded condition (even when there is no load or only a minimal load coupled to the AC generator 120) that is sufficient to prevent wet stacking when variable real loads (e.g., AC loads 101a, 101b, and DC loads 115a-n) are too low to prevent wet stacking. Wet stacking can occur when the diesel engine is run below an optimal operating temperature.

Figure 2:
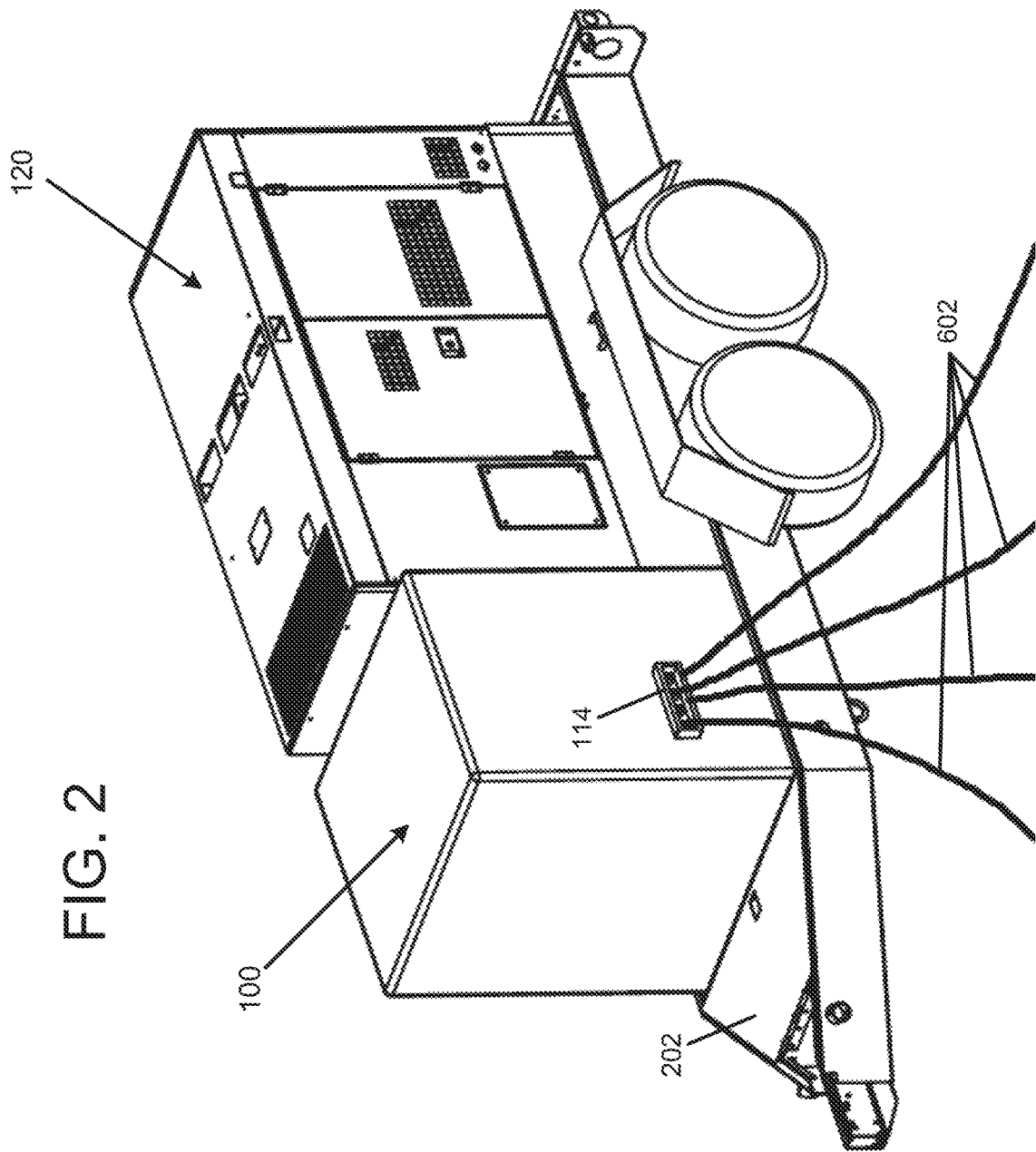
FIG. 2 is a perspective view of an exemplary hybrid energy system arranged alongside a generator and illustrating a DC bus access panel in accordance with the present invention.

FIG. 2 illustrates an exemplary hybrid energy system 100 arranged on a trailer 202 alongside an exemplary AC generator 120. As illustrated in FIG. 2, the hybrid energy system 100 includes a DC bus interface 114 with a plurality of exemplary power cords 602 running to exemplary DC loads 115 or DC power supplies 117 (see FIGS. 5 and 6A-6C).

Figure 3:
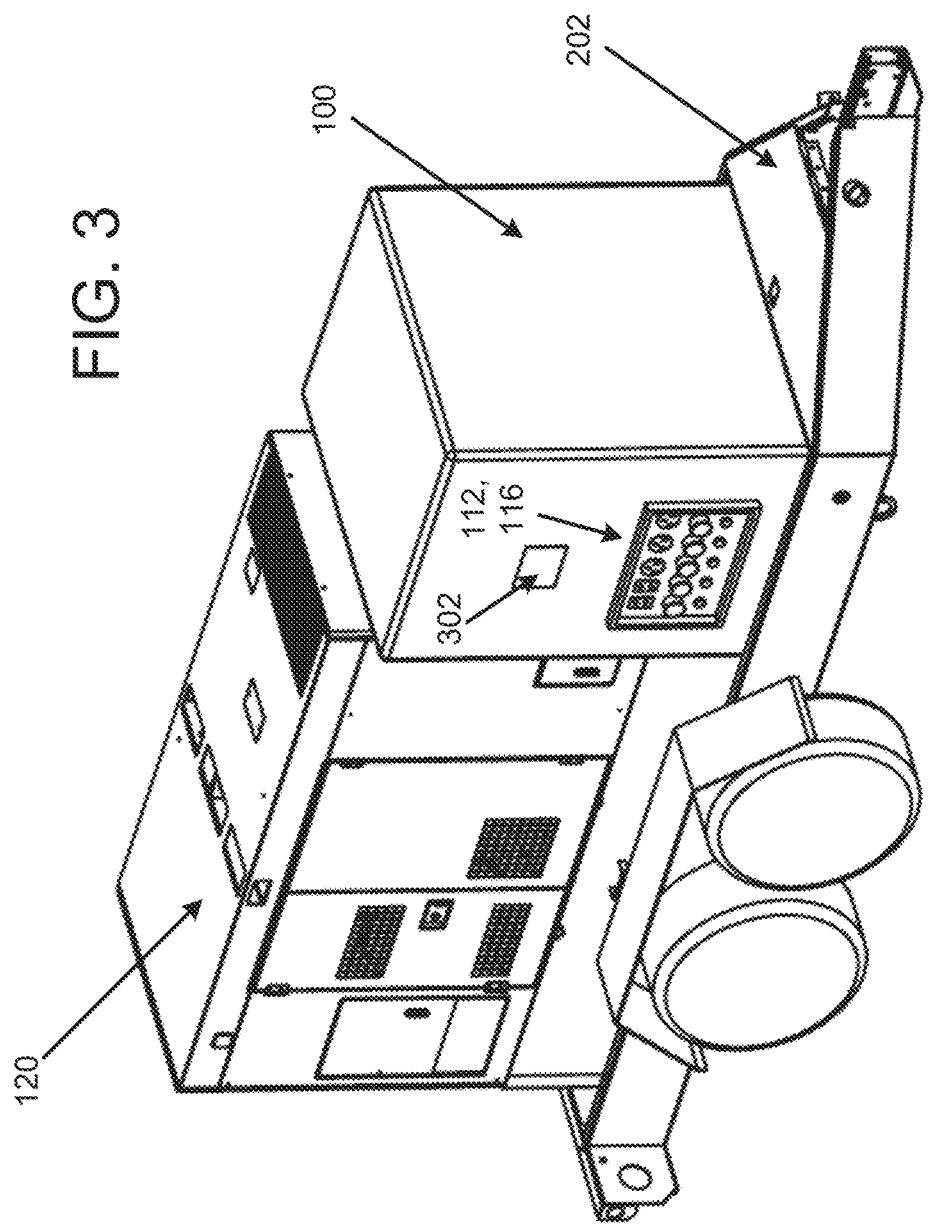
FIG. 3 is an opposite side perspective view of the hybrid energy system and generator of FIG. 2 and illustrating an AC outlet panel.

FIG. 3 illustrates an opposite side of the hybrid energy system 100 and AC generator 120 of FIG. 2. As illustrated in FIG. 3, the hybrid energy system 100 includes an AC outlet interface 112 with a plurality of AC outlets 116. FIG. 3 also illustrates an exemplary programmable control panel 302 for interfacing with the hybrid energy system 100. For example, the control panel 302 allows user interaction with the controller 118 of the hybrid energy system 100. The control panel 302 includes a programmable graphical user interface (e.g., a touch-responsive panel) for inputting user feedback. The control panel 302 displays basic generator information and operational status, which can be monitored and reported. The control panel 302 also displays basic battery and converter/inverter information from the hybrid energy system 100.

Figure 4:
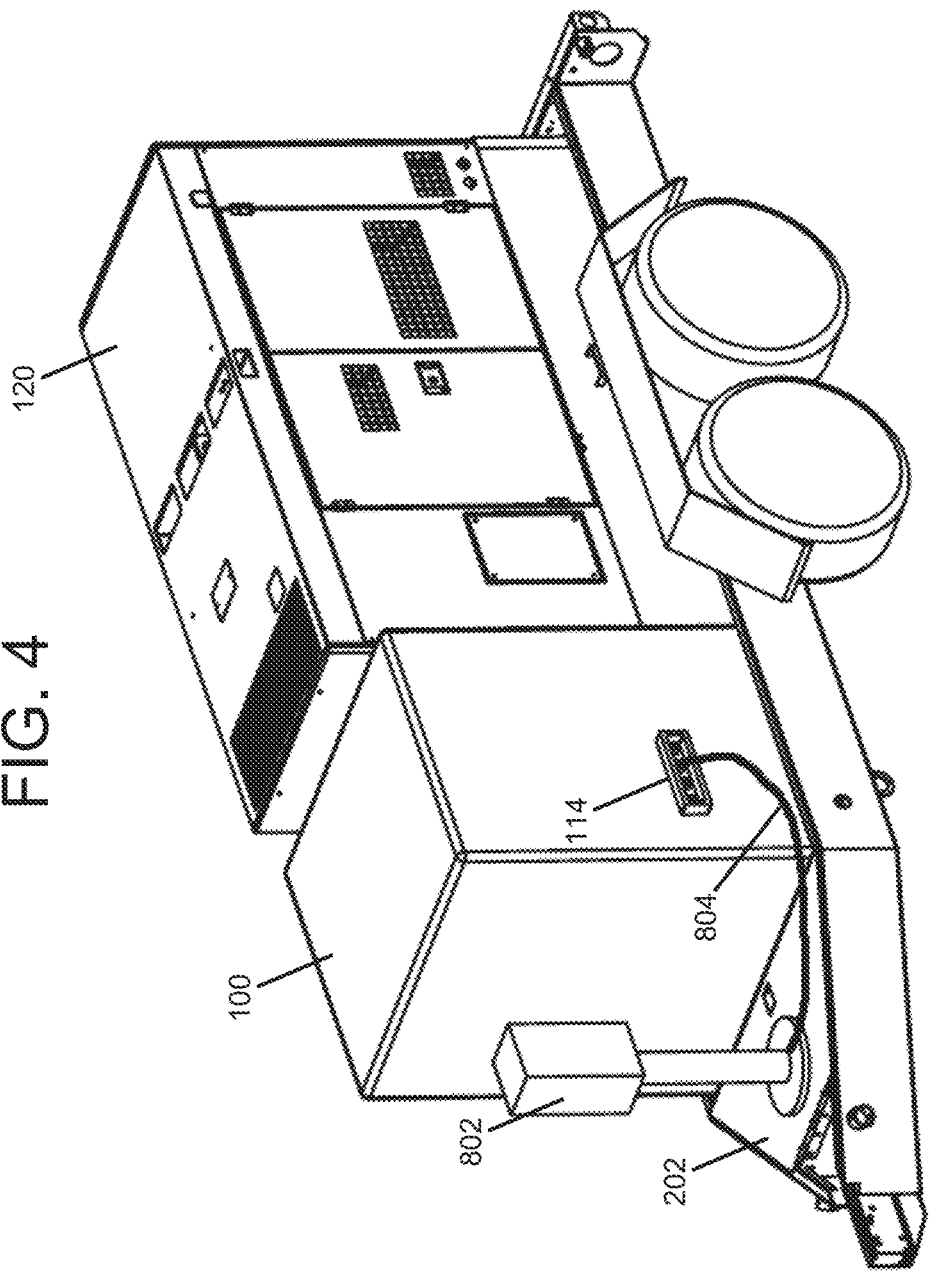
FIG. 4 is a perspective view of the hybrid energy system and generator of FIG. 2 and illustrating an accessory outlet post in accordance with the present invention.

FIG. 4 illustrates the hybrid energy system 100 and AC generator 120 of FIG. 2 with the addition of an exemplary DC outlet box 802. As illustrated in FIG. 4, the DC outlet box 802 is electrically coupled to the DC bus interface 114 via an exemplary cable 804.

Figure 5:
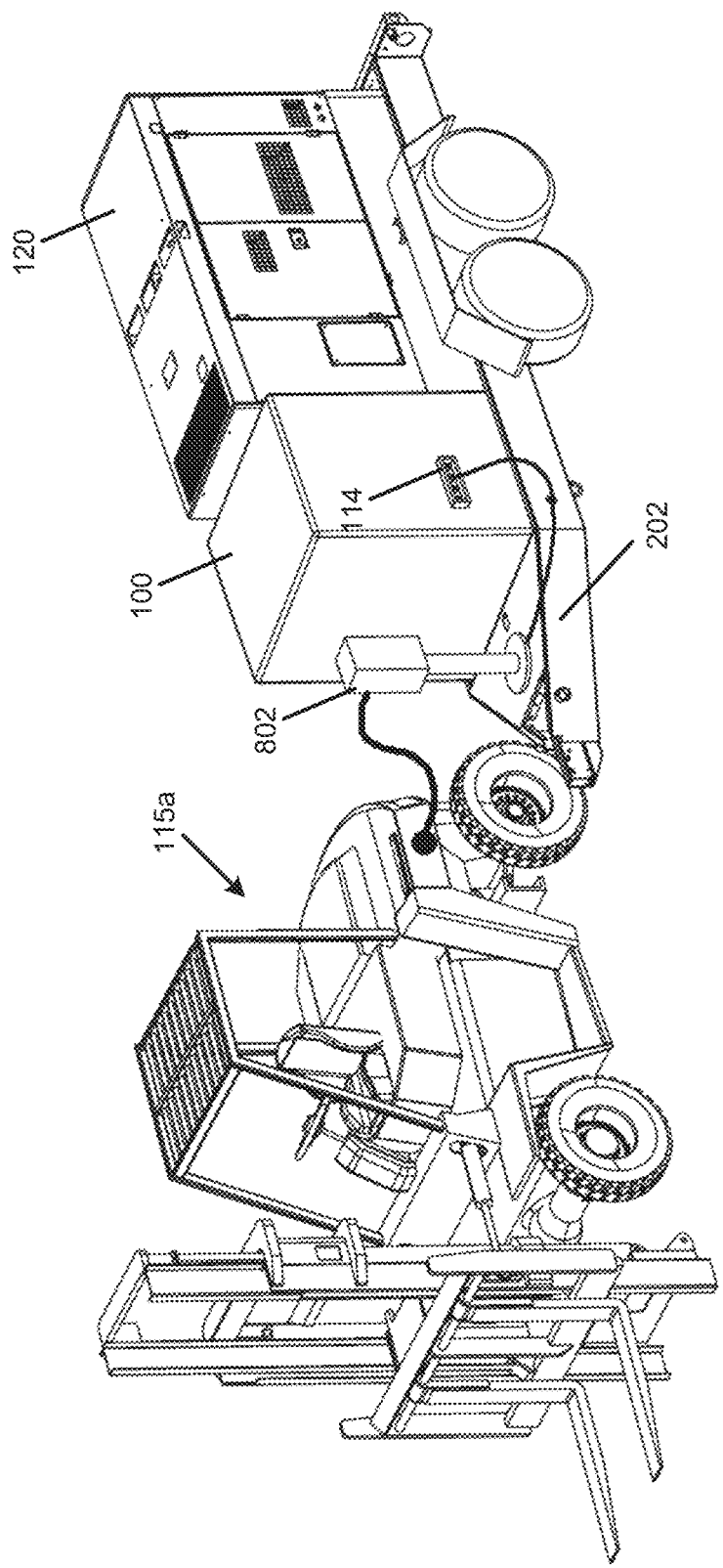
FIG. 5 is a perspective view of the hybrid energy system and generator of FIG. 2 and illustrating an electric vehicle cabled to the accessory outlet post for recharging in accordance with the present invention.

FIG. 5 illustrates the exemplary hybrid energy system 100 and AC generator 120 of FIG. 2, which includes the DC outlet box 802 of FIG. 4. FIG. 5 illustrates an exemplary DC load 115a cabled to the DC outlet box 802 for recharging an onboard battery. While FIG. 5 illustrates an exemplary battery powered forklift as the DC load, other industrial battery powered equipment may be electrically coupled via the DC outlet box 802 for recharging. In an aspect of the present embodiment, one or more DC loads 115 may be coupled to the DC outlet box 802. The DC outlet box 802 is configured to provide DC power for powering and/or recharging. As illustrated in FIG. 6D, the exemplary hybrid energy systems 100 and AC generators 120 may be sized for an expected load need.

In FIG. 6A, an exemplary external power supply 117a is coupled to the DC bus interface 114. In one exemplary embodiment, the power supply 117a illustrated in FIG. 6A is an exemplary external battery bank 117a. The external battery bank 117*a* may be similar to the battery bank 102 or a different configuration or using different energy storage technology or battery chemistry. Referring to FIG. 7, the external power supply 117*a* (of FIG. 6A) is replaced with a second hybrid energy system 100*d* or a plurality of hybrid energy systems 100*d*-100*n*. The controller 118 is configured to control the plurality of hybrid energy systems (100, 100*d*-100*n*). The output of each of the plurality of hybrid energy systems 100, 100*d*-100*d* are tied together using a common bus 702 communicatively coupled to the AC output interfaces of at least two or more of the hybrid energy systems 100, 100*d*-100*n*, such that the plurality of hybrid energy systems 100, 100*d*-100*n* can output in parallel both three-phase and singe-phase AC power. In FIG. 7A, an alternative arrangement of FIG. 7, each of the hybrid energy systems 100*d*-100*n* is paired with an associated generator 120*d*-100*n*. The parallel arrangement illustrated in FIG. 7A allows for additional flexibility with multiple generators 120, 120*d*-120*n* selectively used to power a load or recharge a battery bank 102 in an own hybrid energy system 100 or another parallel-configured hybrid energy system 100*d*-100*n*.

In FIG. 6B, an exemplary external power supply 117*b* is coupled to the DC bus interface 114, via an external power distribution box 1002 which is configured to provide a redundant interface for coupling a load to the generator 120 and the hybrid energy system 100. In one exemplary embodiment, the power supply 117*b* illustrated in FIG. 6B is an external AC generator 117*b*. The external AC generator 117*b* may be similar to the AC generator 120 or a different configuration or using different AC power generation technology. In one aspect of the present embodiment, the external power source outputs a DC voltage via an AC/DC converter in the external AC generator 117*b*. The hybrid energy system 100 may also be paralleled with the external AC generator 117*b*. That is, the AC generator 120 and the external AC generator 117*b* may utilize a common output bus such that the external AC generator 117*b* may be utilized as a spinning reserve.

In a further aspect of the present invention, the hybrid energy system is paralleled with a second generator. The two generators are configured to utilize a common output bus such that the second generator may be utilized as a spinning reserve.

Figure 6C:
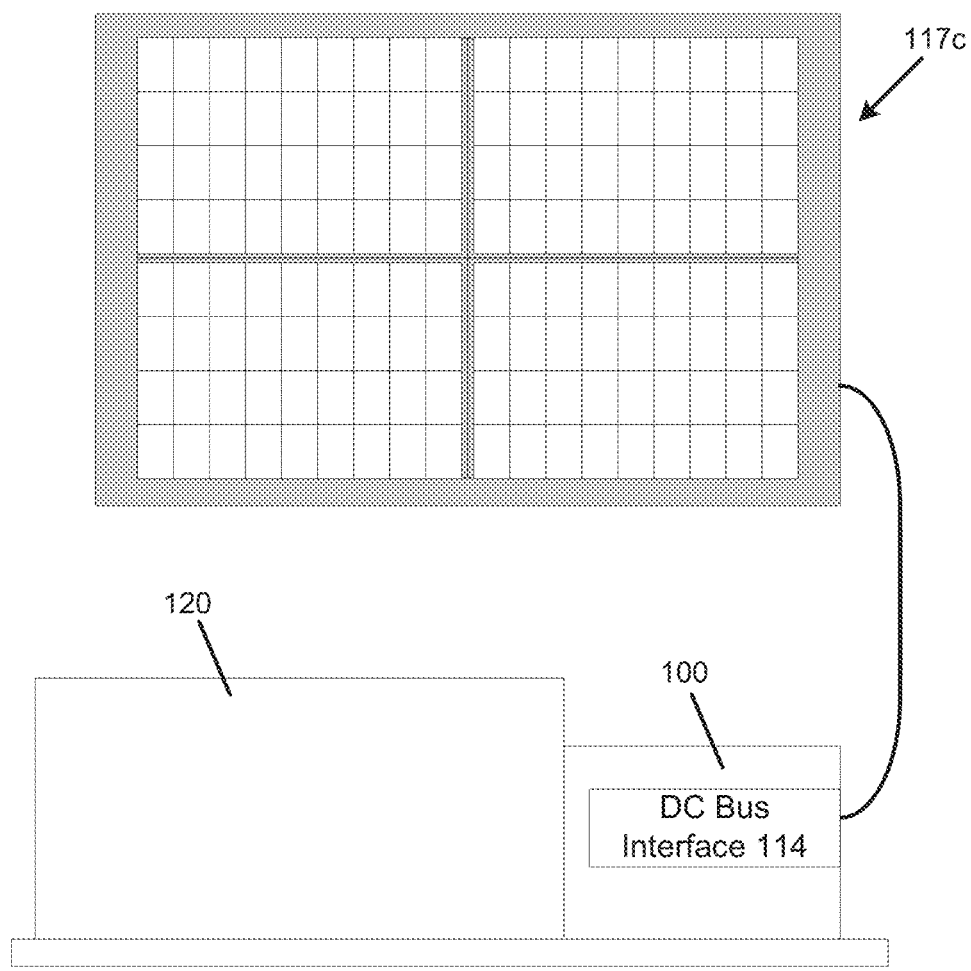
FIG. 6C is a view of an exemplary solar panel array or assembly connected via a DC/DC converter for coupling to an exemplary hybrid energy system via the DC bus access panel in accordance with the present invention.
Figure 6D:
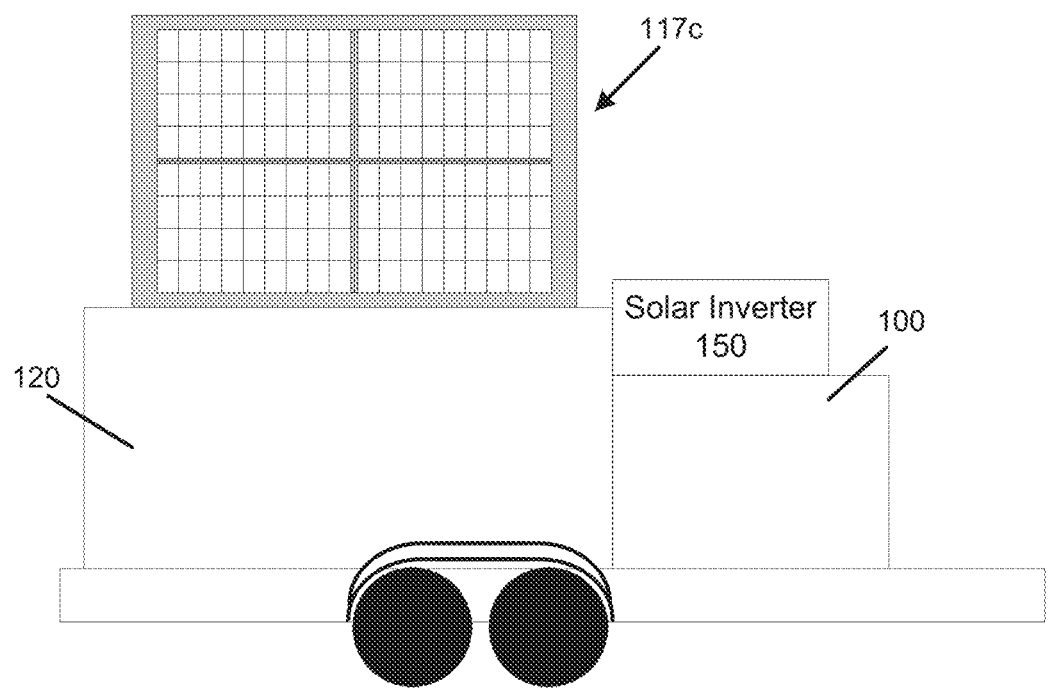
FIG. 6D is a view of the hybrid energy system of FIG. 6C positioned upon a trailer and integrated with a solar panel array in accordance with the present invention.

In FIG. 6C, an exemplary external power supply 117*c* is coupled to the DC bus interface 114. In one exemplary embodiment illustrated in FIG. 6C, the power supply 117*c* is an exemplary solar panel array 117*c*. Other alternative renewable energy sources are also considered, such as, wind-driven turbines, fuel cell technology, and other energy sources. The alternative power sources of FIGS. 6A-6H provide redundancy of energy storage or generation. The external power distribution box 1002 and the DC outlet box 802 provide redundant interfaces for coupling a load to the generator 120 and the hybrid energy system 100. In FIG. 6D, an exemplary on-board solar panel 117*c* and solar inverter 150 are plugged into an AC outlet interface 112 providing power to a load and charging batteries 102 of the hybrid energy system 100 (through either of the DC/DC converters 104, 113 of the hybrid energy system 100) when loads are below the output of the solar panels 117*c*.

As illustrated in FIGS. 6A-6H, a plurality of hybrid energy systems 100 may be coupled together to run in parallel. Each output of the plurality of hybrid energy systems 100 are tied together using a common bus communicatively coupled to the AC output interfaces of two or more hybrid energy systems 100 of the plurality of hybrid energy systems, such that the plurality of hybrid energy systems output in parallel both three-phase and single-phase AC power. As also illustrated in FIGS. 6A-6H, the hybrid energy systems 100 and generators 120 may be configured in various sizes and shapes. For example, the hybrid energy systems 100 and generators of FIGS. 6F-6H (as well as others illustrated in FIGS. 6A-6E) are not drawn to scale.

Figure 6F:
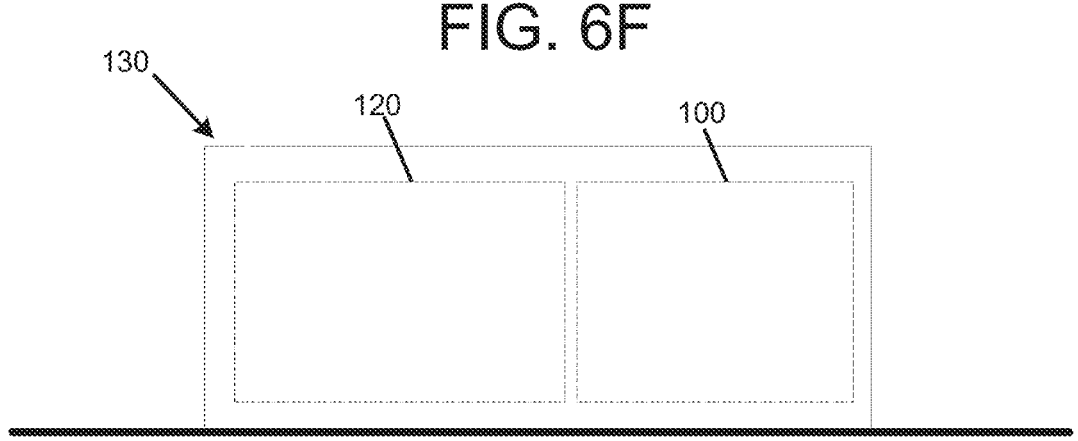
FIG. 6F is a block diagram of a hybrid energy system and generator arranged together within a unitary housing for stationary operation in accordance with the present invention.
Figure 6G:
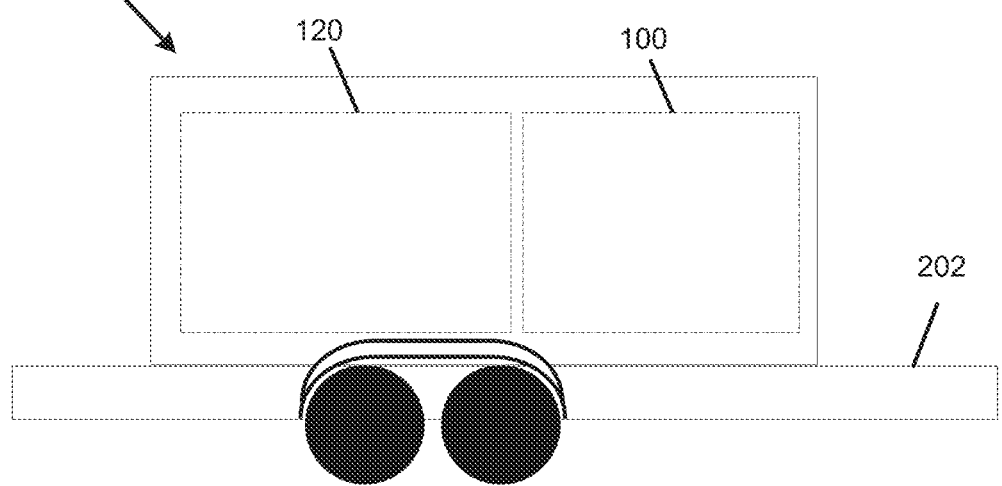
FIG. 6G is a block diagram of the hybrid energy system and generator of FIG. 6E arranged on a trailer in accordance with the present invention.
Figure 6H:
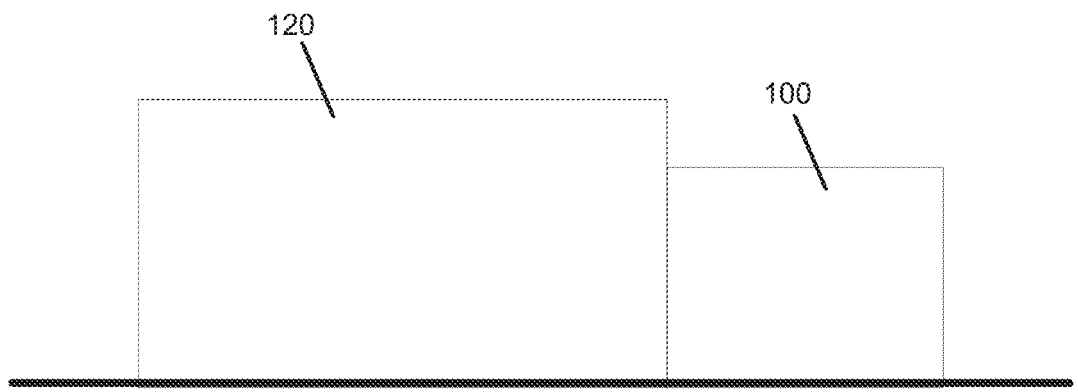
FIG. 6H is a block diagram of an exemplary hybrid energy system and generator arranged for stationary operation in accordance with the present invention.
Figure 7:
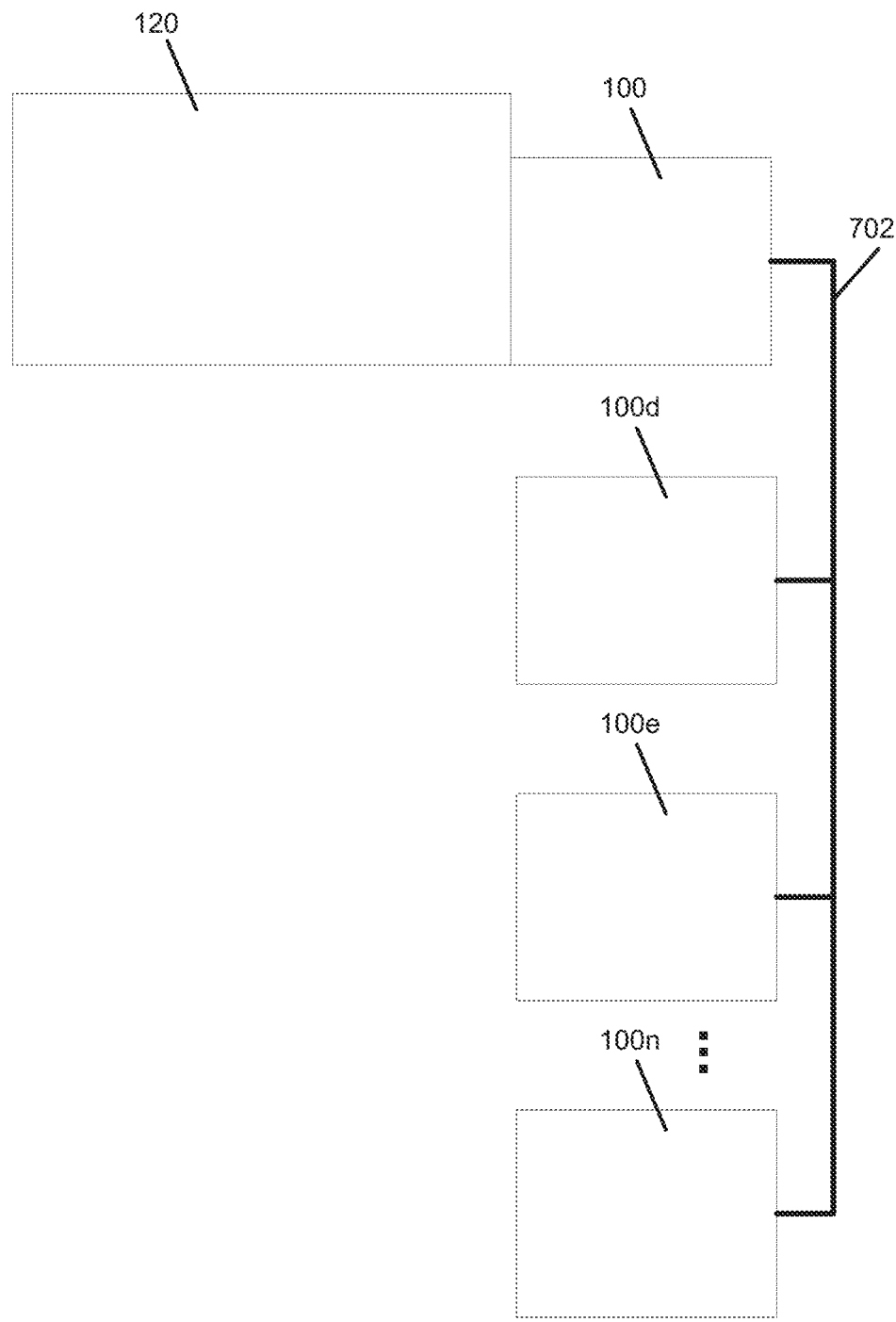
FIG. 7 is a block diagram of an exemplary hybrid energy system and generator arranged in parallel with a plurality of hybrid energy systems in accordance with the present invention.
Figure 7A:
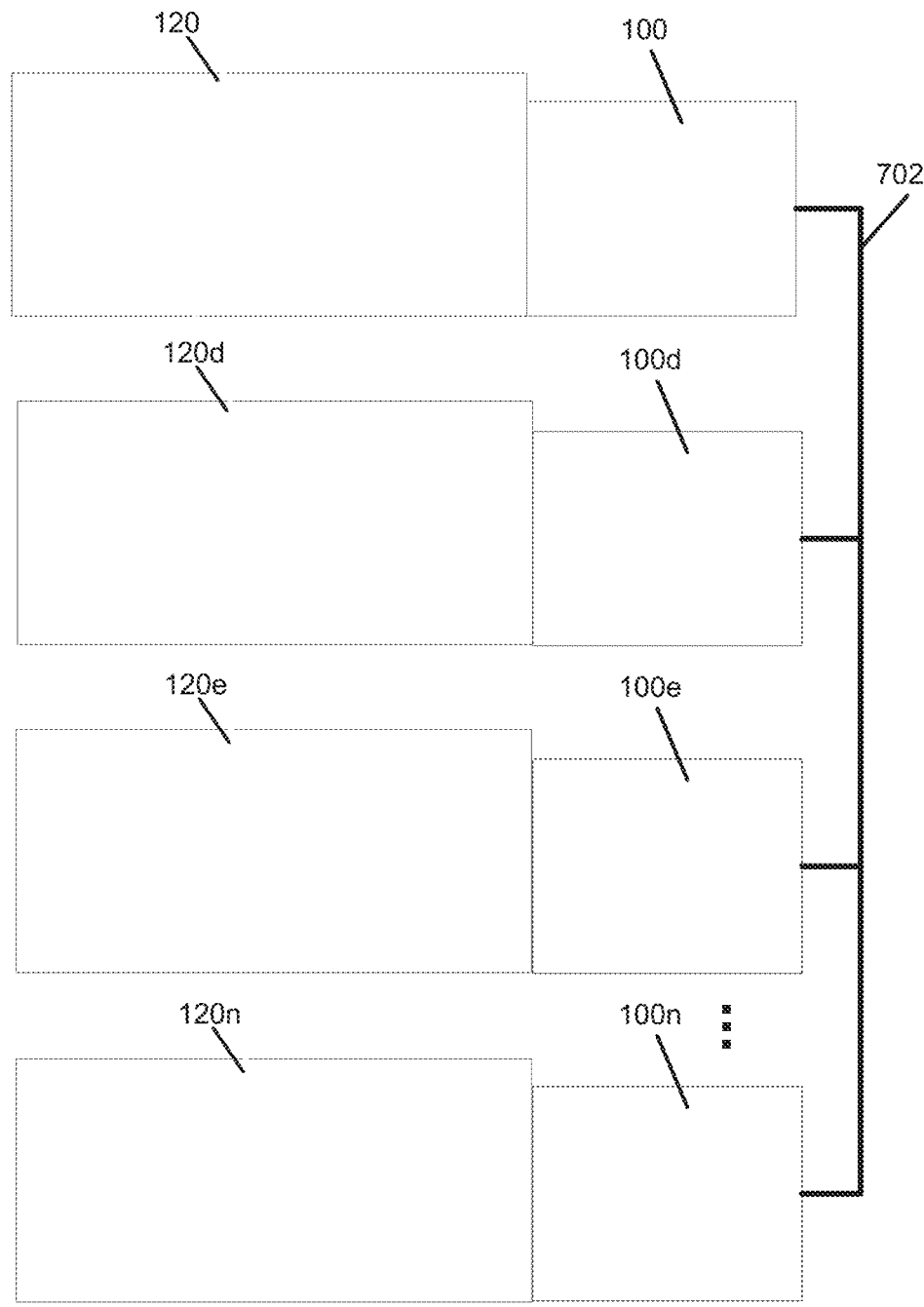
FIG. 7A is a block diagram of an alternative hybrid energy system and generator arranged in parallel with a plurality of hybrid energy systems and associated generators in accordance with the present invention.

FIG. 6E illustrates a trio of exemplary embodiments with varying sizes of hybrid energy systems 100*a*, 100*b*, and 100*c*, and corresponding varying sizes of AC generators 120*a*, 120*b*, and 120*c*. As illustrated in FIG. 6D, exemplary embodiments may be sized to fit a desired operational environment and AC and/or DC power load needs. In FIG. 6F, a hybrid energy system 100 and a generator 120 are arranged within a unitary body 130. Such an arrangement 130 may be positioned upon a trailer 202 (see FIG. 6G) or configured as free-standing or stationary (FIG. 6F). Such coupled versions (with separate enclosures for the hybrid energy system 100 and the generator 120) may also be arranged as free-standing or stationary (see FIG. 6H). The unitary body arrangement 130 may be substituted for any of the embodiments with generators 120 and hybrid energy systems 100 arranged in separate housings. For example, the generators 120*d*-120*n* and hybrid energy systems 100*d*-100*n* of FIG. 7A, which are illustrated as being arranged within separate housings, could be replaced with the generator/hybrid energy system combinations arranged in unitary bodies 130. In another exemplary embodiment, a combination of unitary bodies 130 (each housing a generator 100/hybrid energy system 120 arrangement) could be used together with one or more generators 120 and hybrid energy systems 100 in separate housings.

While the control panel 302 (see FIG. 3) displays hybrid energy system voltage outputs and operating parameters, in an aspect of the embodiments discussed herein, output voltage and operating parameters can be selected from the control panel 302. The selected voltage can also be fine-tuned and adjusted up or down by up to 10% by the user via the control panel 302. For example, an exemplary user may require an output voltage of 210 VAC instead of 208 VAC. Such adjustment may be necessary when the electrical device drawing power from the hybrid energy system 100 is a distance from the hybrid energy system 100 and experiencing a resulting voltage drop.

The control panel 302 also allows for the control of the DC bus interface 114 and any peripheral attached thereto (e.g., electrical devices coupling directly to the DC bus interface 114 or via the DC outlet box 802).

Access to the DC bus 106 (via the DC bus interface 114) allows for the connection of, for example, level 3 DC electrical vehicles or equipment, or for fast charging of electrical equipment. Such DC voltage provision can be used for mobile or temporary energy delivery applications.

Exemplary hybrid energy systems 100 and diesel generators 120 may be utility mounted to the bed of a pickup truck or towed on a trailer to be used as a mobile vehicle charger for EV vehicles or construction equipment and providing, for example, level 3 DC charging up to an exemplary 250 kilowatts or higher. Exemplary electrical equipment includes construction elevators, rechargeable construction equipment, welding equipment, pumps, job trailers, lifts and cranes, location events and/or films, and the use of remote communication equipment, such as cell towers and microwave equipment where refueling is more difficult.

In an alternative embodiment, the hybrid energy system 100 is configured to receive power from a DC generator 122 (replacing the AC generator 120 with a DC generator 122)

(see FIG. 1). Subsequently, the AC/DC converter 108 would be replaced with a DC/DC converter (similar to the DC/DC converter 104). This additional DC/DC converter would be configured to receive the DC voltage output of the DC generator and convert it to the required voltage level for the DC bus 106. Note that the AC/DC converter 108 can be eliminated (when replacing the AC generator 120 with a DC generator 122) if the DC generator 122 contains an alternator that matches the voltage level of the DC bus 106.

Thus, the exemplary embodiments discussed herein improve the efficiency of a diesel generator by running it at its optimal load and reducing its run time by storing unused generated power to a battery. When the battery bank of the hybrid energy system is sufficiently charged, the generator can be shut down to reduce run time and the battery bank of the hybrid energy system may run the load entirely until it reaches a charge threshold limit. The generator would be turned back on when the battery bank's charge level reaches the threshold limit and provides power to the load while using any unused power to recharge the battery bank. The generator could also be turned on regardless of the battery bank's charge level when the load approaches either the generator's load capacity or the battery bank's load capacity. The hybrid energy system minimizes generator run hours, improve fuel consumption, and reduces emissions compared to a conventional generator setup to power a load. If using a variable speed generator, rpm may increase as needed to provide more power if the output load is greater than the output of the DC/DC converter.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A hybrid energy system configured to carry a power load for a generator configured to output a first AC signal, the hybrid energy system comprising:
   a battery bank comprising a plurality of batteries and configured to output a first DC signal;
   a DC/DC converter, when operating in a first mode, is configured to receive and convert the first DC signal into a second DC signal, wherein the second DC signal is output to a DC bus;
   an AC/DC converter configured to receive and convert the first AC signal from the generator into a third DC signal, wherein the second DC signal and the third DC signal are tied together on the DC bus;
   a DC/AC converter configured to receive and convert the second DC signal from the DC bus into a second AC signal, wherein the second AC signal is output to an AC outlet interface;
   a controller operable to control the DC/DC converter and to select a second mode for the DC/DC converter, wherein the DC/DC converter, when operating in the second mode, is configured to receive and convert the second DC signal from the DC bus into a fourth DC signal, wherein the fourth DC signal is output to the battery bank to recharge the battery bank, wherein the first mode is a battery discharge mode and the second mode is a battery recharge mode;
   wherein the controller is configured to output a startup signal to the generator to start outputting the first AC signal when the controller selects the second mode for the DC/DC converter, wherein the controller is configured to control the operation of the generator such that the generator warms up and cools down before shutdown, and wherein the controller is configured to control the operation of the generator such that the generator ramps up its power output and ramps down its power output.

2. The hybrid energy system of claim 1, wherein the controller is operable to adjust a voltage level of the second DC signal.

3. The hybrid energy system of claim 2, wherein the controller is configured to output a shutdown signal to the generator to stop outputting the first AC signal when the controller selects the first mode for the DC/DC converter.

4. The hybrid energy system of claim 2, wherein the controller is configured to control the recharging of the battery bank such that the generator, when running, operates at an optimal and/or full load, and wherein the controller is configured to control the discharge of the battery bank, such that an operational run time of the generator is minimized.

5. The hybrid energy system of claim 1 further comprising a DC bus interface configured to couple to the DC bus, wherein the DC bus interface is configured to electrically couple an electrical device to the DC bus such that the DC bus outputs a fifth DC voltage to the electrical device via the DC bus interface, wherein the electrical device is one or more of electrical vehicle chargers, battery-powered construction equipment, electrical equipment, and consumer electrical devices.

6. The hybrid energy system of claim 5, wherein the DC bus interface is configured to electrically couple an external power source to the DC bus such that the external power source outputs a sixth DC voltage to the DC bus via the DC bus interface, wherein the external power source comprises one or more of external battery banks, solar panel energy sources, wind-powered generators, and secondary (backup) generators.

7. The hybrid energy system of claim 1, wherein the system is configured to simultaneously output a plurality of AC signals, wherein the plurality of AC signals comprises one or more of single-phase voltages of 120V and/or 240V, and three-phase voltages of 120V/208V and/or 277V/480V, and wherein the plurality of AC signals comprises voltages and frequencies for use in Europe and Canada, as well as other applications that require different voltages and frequencies that the DC/AC converter can output.

8. A method for controlling a hybrid energy system that is carrying a power load of a generator, wherein the method comprises:
   outputting, with a battery bank, a first DC signal;
   receiving and converting, with a DC/DC converter, the first DC signal into a second DC signal and outputting the second DC signal to a DC bus;
   receiving and converting, with an AC/DC converter, a first AC signal output by the generator into a third DC signal, wherein the second DC signal and the third DC signal are tied together on the DC bus;
   receiving and converting, with a DC/AC converter, the second DC signal from the DC bus into a second AC signal, wherein the second AC signal is output to an AC outlet interface;
   operating the DC/DC converter in one of a plurality of modes, wherein a first mode comprises the hybrid energy system outputting a shutdown signal to the generator to stop outputting the first AC signal; and
   wherein a second mode comprises the hybrid energy system receiving and converting the second DC signal from the DC bus into a fourth DC signal and outputting the fourth DC signal to the battery bank to recharge the battery bank, wherein the second mode further comprises the hybrid energy system outputting a startup signal to the generator to start outputting the first AC signal, wherein the first mode is a battery discharge mode, and the second mode is a battery recharge mode.

9. The method of claim 8 further comprising adjusting the DC/DC converter to adjust a voltage level of the second DC signal.

10. The method of claim 8 further comprising adjusting the AC/DC converter to adjust the voltage level of the third DC signal.

11. The method of claim 8 further comprising adjusting the DC/AC converter to adjust the voltage level of the second AC signal.

12. The method of claim 8 further comprising electrically coupling an electrical device to the DC bus via a DC bus interface that is electrically coupled to the DC bus, wherein the DC bus outputs a fifth DC voltage to the electrical device via the DC bus interface, wherein the electrical device is one or more of electrical vehicle chargers, battery-powered construction equipment, electrical equipment, and consumer electrical devices.

13. The method of claim 8 further comprising electrically coupling an external power source to the DC bus via the DC bus interface, wherein the external power source outputs a sixth DC voltage to the DC bus via the DC bus interface, wherein the external power source comprises one or more of external battery banks, solar panel energy sources, wind-powered generators, and secondary (backup) generators.

14. The method of claim 13, wherein the external power source is used to recharge the battery bank via the DC bus.

15. The method of claim 8, wherein the DC/AC converter simultaneously outputs a plurality of AC signals, wherein the plurality of AC signals comprises one or more of single-phase voltages of 120V and/or 240V, and three-phase voltages of 120V/208V and/or 277V/480V, and wherein the plurality of AC signals comprises voltages and frequencies for use in Europe and Canada, as well as other applications that require different voltages and frequencies that the DC/AC converter can output.

16. The method of claim 8 further comprising controlling a plurality of hybrid energy systems, wherein the output of each of the plurality of hybrid energy systems are tied together using a common bus communicatively coupled to the AC output interfaces of two or more hybrid energy systems of the plurality of hybrid energy systems such that the plurality of hybrid energy systems output in parallel both three-phase and single-phase AC, wherein the method further comprises the hybrid energy system paralleled with a second generator, and wherein the two generators utilize a common output bus such that the second generator is utilized as a spinning reserve.

17. The method of claim 16, wherein while the generator is powered down, the hybrid energy system continues to power the load with one or more simultaneous output voltages, and wherein the generator is available for service or maintenance while the hybrid energy system powers the load.

18. The hybrid energy system of claim 2, wherein the controller is configured to control the recharging of the battery bank such that the generator, when recharging the battery bank, operates at a full load or where the generator is most efficient.

19. The method of claim 8, wherein the second mode further comprises the hybrid energy system controlling the recharging of the battery bank such that the generator, when recharging the battery bank, operates at a full load or where the generator is most efficient.

* * * * *

UNITED STATES PATENT AND TRADEMARK OFFICE
CERTIFICATE OF CORRECTION

PATENT NO. : 12,283,822 B2
APPLICATION NO. : 18/320428
DATED : April 22, 2025
INVENTOR(S) : Michael Yin et al.

Page 1 of 1

It is certified that error appears in the above-identified patent and that said Letters Patent is hereby corrected as shown below:

In the Claims

Column 16
Line 10, Claim 16, "AC output" should be --AC outlet--

Signed and Sealed this
Twentieth Day of May, 2025

Coke Morgan Stewart
*Acting Director of the United States Patent and Trademark Office*